(12) United States Patent
Birch et al.

(10) Patent No.: US 12,485,416 B2
(45) Date of Patent: Dec. 2, 2025

(54) APPARATUS FOR SORTING MICROFLUIDIC PARTICLES

(71) Applicant: Cellular Highways Ltd., Royston (GB)

(72) Inventors: Steve Birch, Royston (GB); Mette La Cour, Royston (GB); Matthias Ediger, Royston (GB); Tony Hailes, Royston (GB); Fred Hussain, Royston (GB); Huatao Liu, Royston (GB); Robyn Pritchard, Royston (GB); Salman Samson Rogers, Royston (GB); Allan Sinclair, Royston (GB); Michael Withers, Royston (GB); Gang Xiong, Royston (GB); Alexander Zhukov, Royston (GB)

(73) Assignee: Cellular Highways Ltd., Royston (GB)

( * ) Notice: Subject to any disclaimer, the term of this patent is extended or adjusted under 35 U.S.C. 154(b) by 942 days.

(21) Appl. No.: 17/616,000

(22) PCT Filed: Jun. 2, 2020

(86) PCT No.: PCT/EP2020/065220
§ 371 (c)(1),
(2) Date: Dec. 2, 2021

(87) PCT Pub. No.: WO2020/245118
PCT Pub. Date: Dec. 10, 2020

(65) Prior Publication Data
US 2022/0234042 A1    Jul. 28, 2022

(30) Foreign Application Priority Data
Jun. 3, 2019 (EP) .................................... 19177923

(51) Int. Cl.
*B01L 3/00*    (2006.01)

(52) U.S. Cl.
CPC ..... *B01L 3/502715* (2013.01); *B01L 3/50273* (2013.01); *B01L 3/502753* (2013.01);
(Continued)

(58) Field of Classification Search
CPC .......... B01L 3/502715; B01L 3/50273; B01L 3/502753; B01L 2200/04;
(Continued)

(56) References Cited

U.S. PATENT DOCUMENTS

2010/0021984 A1    1/2010  Edd et al.
2012/0318719 A1    12/2012 Lean et al.
(Continued)

FOREIGN PATENT DOCUMENTS

EP    3290921 A1    3/2018
WO    2017096243 A1  6/2017
(Continued)

OTHER PUBLICATIONS

PCT Patent Application PCT/EP2020/065220 International Search Report and Written Opinion issued Oct. 14, 2020.
(Continued)

*Primary Examiner* — Jill A Warden
*Assistant Examiner* — Alex Ramirez
(74) *Attorney, Agent, or Firm* — Erise IP, P.A.

(57) ABSTRACT

A consumable cartridge for a particle sorter system, the consumable cartridge comprising: an inlet for receiving a particle-containing fluid; a microfluidic chip comprising: an input channel in fluidic connection with the inlet; and a particle sorter junction in fluidic connection with the input channel and comprising an output positive channel and an output negative channel; and first and second outlets in
(Continued)

fluidic connection with the output positive channel and the output negative channel respectively, for discharging the fluid from the consumable cartridge, such that at least one enclosed fluidic path is provided in the consumable cartridge between the inlet and the first and second outlets.

17 Claims, 9 Drawing Sheets

(52) U.S. Cl.
CPC ... *B01L 2200/04* (2013.01); *B01L 2200/0689* (2013.01); *B01L 2300/0819* (2013.01); *B01L 2300/0883* (2013.01); *B01L 2300/123* (2013.01); *B01L 2400/0409* (2013.01)

(58) Field of Classification Search
CPC ..... B01L 2200/0689; B01L 2300/0819; B01L 2300/0883; B01L 2300/123; B01L 2400/0409

See application file for complete search history.

(56) References Cited

U.S. PATENT DOCUMENTS

| 2013/0140177 | A1* | 6/2013 | Lin | G01N 27/3273 |
| | | | | 204/403.02 |
| 2015/0024476 | A1* | 1/2015 | Butler | B01L 3/502761 |
| | | | | 435/288.7 |
| 2015/0328637 | A1 | 11/2015 | Perrault, Jr. et al. | |
| 2016/0158758 | A1 | 6/2016 | Johnson et al. | |
| 2016/0289669 | A1 | 10/2016 | Fan et al. | |
| 2018/0353958 | A1* | 12/2018 | Hinojosa | B01J 4/00 |

FOREIGN PATENT DOCUMENTS

| WO | 2017201546 A1 | 11/2017 |
| WO | 2018193258 A1 | 10/2018 |

OTHER PUBLICATIONS

Dino Di Carlo et al., "Equilibrium Separation and Filtration of Particles Using Differential Inertial Focusing", Analytical Chemistry, American Chemical Society, vol. 80, No. 6, pp. 2204-2211, XP002496651, ISSN: 0003-2700, Mar. 15, 2008.

* cited by examiner

APPARATUS FOR SORTING MICROFLUIDIC PARTICLES

RELATED APPLICATIONS

The present application is a national stage application under 35 U.S.C. § 371 of International Application No. PCT/EP2020/065220, filed 2 Jun. 2020, which claims priority to European Patent Application No. 19177923.0, filed 3 Jun. 2019. The above referenced applications are hereby incorporated by reference in their entirety.

BACKGROUND OF THE INVENTION

The present invention relates to particle sorter systems, in particular a consumable cartridge and instrument for a particle sorter system. The invention further relates to a chip mount for supporting a microfluidic chip in a consumable cartridge for a particle sorter system, and an inertial particle focusser for a microfluidic particle sorter.

Instruments for particle sorting have widespread uses in biological research. A major application of particle sorting technology is to sort biological cells. Instrumentation for sorting cells based on measurements of fluorescent labels within the cells is typically known as fluorescence activated cell sorting (FACS). Other applications of particle sorting include the sorting of solid beads or liquid droplets of one liquid phase in a carrier fluid. For example, aqueous droplets in a non-aqueous carrier fluid can be used to contain cells. Thus, the particles to be sorted may, for example, be cells, beads, or droplets containing further particles.

A new application of cell sorting technology is the research, development and production of cell therapies. Many newer cell therapies require the sorting of large numbers of cells. For example, many new autologous T-cell therapies require sorting of relatively rare subsets of T-lymphocyte cells from peripheral blood mononuclear cells (PBMCs). Applications in regenerative medicine often require separation of rare multipotent or progenitor cells based on several molecular markers. Most current cell sorting instruments are not suitable for GMP (good manufacturing practice) production of therapeutic products, since they are not considered 'safe by design' for the operator or patient. One reason is that the fluid-wetted components are not easily sterilised. These products also produce aerosols which may harm the operator.

To satisfy this need, the applicant has created microfluidic particle sorting technology as described in patent publication WO 2018/193258 A1, the content of which is incorporated by reference herein in its entirety. The present invention relates to instruments and consumables for implementing that technology.

The solutions described herein provide an instrument and a consumable item for particle and cell sorting that is suitable for high-throughput sorting of cells, at high viability, yield and purity, in a short amount of time, in an enclosed microfluidic chip, within a (preferably sterile) consumable cartridge, which can be mounted in an instrument that can provide optical analysis, electronic control, user interface and data output.

SUMMARY OF THE INVENTION

According to an aspect of the invention, there is provided a consumable cartridge for a particle sorter system, the consumable cartridge comprising: an inlet for receiving a particle-containing fluid; a microfluidic chip comprising: an input channel in fluidic connection with the inlet; and a particle sorter junction in fluidic connection with the input channel and comprising an output positive channel and an output negative channel; and first and second outlets in fluidic connection with the output positive channel and the output negative channel respectively, for discharging the fluid from the consumable cartridge, such that at least one enclosed fluidic path is provided in the consumable cartridge between the inlet and the first and second outlets.

The consumable cartridge can be supplied separately from other parts of the particle sorter system and conveniently installed therein. Furthermore, because the microfluidic chip and the fluidic path(s) are contained within the consumable cartridge, instruments of the system are effectively partitioned from the fluidic path(s) in operation, such that undesirable cross-contamination between the fluid sample and the instruments may be avoided. Thus sterility can be assured. Moreover the consumable cartridge safely contains the fluid sample so as to prevent exposure of the patient and system operator to the fluid sample.

As used herein, the word "cartridge" takes its common meaning, that is to say a case or a container or the like, for ready insertion into a device or mechanism which is configured to receive the cartridge or a part thereof.

As used herein, the word "consumable" takes its common meaning, that is to say a disposable product which is discarded having reached its end-of-life, typically after a single use.

As used herein, the word "particle" encompasses biological cells, solid beads, and liquid droplets of one liquid phase in a carrier fluid (such as aqueous droplets in a non-aqueous carrier fluid). Liquid droplets may themselves contain further particles.

As used herein, the word "fluid" encompasses both aqueous and non-aqueous fluids, typically in the liquid or gas phase. For the purposes of the present invention, such a fluid typically contains particles, although fluids not containing particles may also be used.

The skilled person will understand that the terms "particle" and "fluid" are not limited to the above definitions and should also be interpreted according to their understood meanings in the art.

Throughout this specification, the terms "output positive channel", "positive output channel" and "positive outlet" are used interchangeably. Similarly, "output negative channel" should be read as interchangeable with "negative output channel" and "negative outlet".

The inlet may comprise a syringe connector configured to receive a syringe for supplying the fluid to the consumable cartridge.

At least one of the first and second outlets may be configured for detachable connection with a vessel (e.g. centrifuge tube(s)) for receiving the discharged fluid. This avoids the need for the sample to be pipetted out for onward processing, which is undesirable because it tends to leave valuable sample material behind. The detachable vessel(s) allows for onward processing of an un-pipetted sample.

The at least one of the first and second outlets may comprise a tubular structure for detachable connection with a complementary tubular vessel. Alternatively the at least one of the first and second outlets may be a unitary structure comprising a vessel, for example a tubular vessel.

The at least one fluidic path may comprise at least one of: a first flexible tube (see first flexible tube 415 described with reference to FIG. 4A) connected between the output positive channel and the first outlet; and a second flexible tube (see second flexible tube 416 described with reference to FIG.

Figures 4A, 4B:
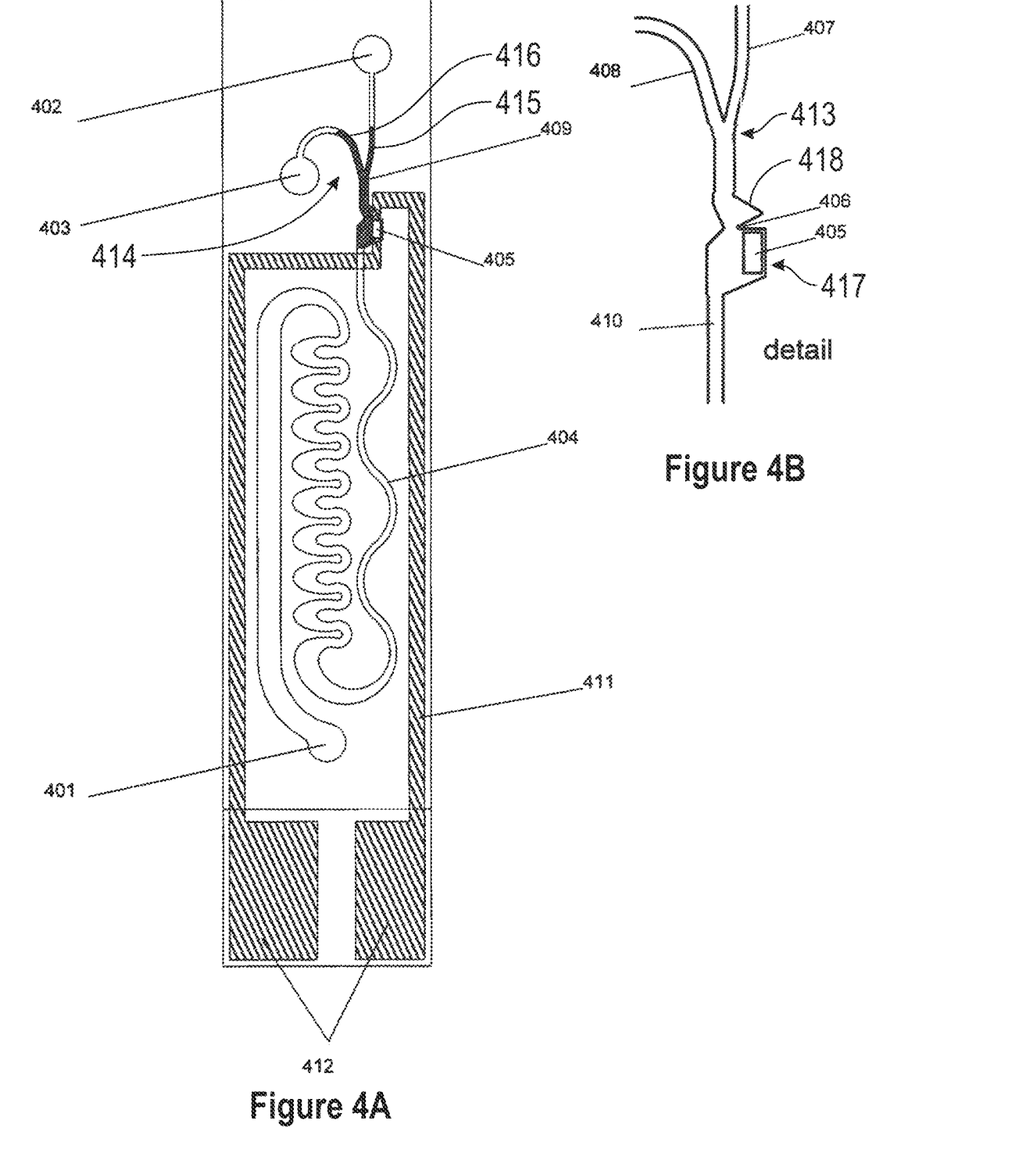

4A) connected between the output negative channel and the second outlet, the first and/or second flexible tubes being deformable to enable unclogging of particles in the particle sorter junction in operation.

The microfluidic chip may comprise: a bubble generator (see bubble generator 417 with reference to FIG. 4B), operable to selectively displace the fluid around a particle to be sorted and thereby to create a transient flow of the fluid in the input channel; and a vortex element (see vortex-creating edge 406 with reference to FIG. 4B), configured to cause a vortex in the transient flow in order to direct the particle to be sorted into the output positive channel.

In the microfluidic chip, for example comprising a single-junction sorter chip, in use the vortex element causes a vortex to be created in the transient flow, which is provided by actuation of the bubble generator. The resultant vortex travels downstream with the particle to be sorted and causes a displacement (i.e. laterally of the flow axis) of the particle toward and into the output positive channel. This displacement is larger than the displacement that would be caused by the actuation of the bubble generator in the absence of the vortex element, and the vortex element therefore obviates the need for a bubble generator provided in a side channel. This advantageously allows for single-junction sorters to be efficiently parallelized on a chip.

The vortex element may comprise a protrusion in the input channel. The vortex element may comprise a turn in the input channel. The vortex element may comprise a recess in the input channel. The vortex element may be between the bubble generator and the output positive channel. It will be understood that the vortex element may take any shape, form or geometry which is suitable to provide a vortical flow for directing the selected particle to the output positive channel.

The bubble generator may comprise a microheater. In this case, the fluid may be any liquid that is sufficiently volatile for the microheater to generate a bubble, such as water, an aqueous solution, or a non-aqueous carrier medium.

The single-junction sorter may be configured, in the non-operation of the bubble generator and thereby absence of the said transient flow, to direct the particles into the output negative channel.

The single-junction sorter may comprise an inertial focuser configured to centralise the particles in the fluid along a streamline or multiple streamlines along one axis of the input channel. The inertial focuser may comprise a serpentine channel. The input channel may comprise the inertial focuser.

Debris may accumulate during operation of the single-junction sorter. In order to address this issue, the single junction sorter may comprise a valve configured to close to prevent the fluid passing through the output positive channel in order to disrupt the flow of the fluid and thereby direct accumulated debris towards the output negative channel.

The microfluidic chip may comprise an array of single-junction sorters each as described herein above. The microfluidic chip may comprise an array of microlenses, each microlens being aligned with a respective one of the array of single-junction sorters. The microfluidic particle sorter may comprise an objective lens arrangement including one or more objective lenses. The objective lens arrangement may be configured to deliver light to and collect light from every single-junction sorter of the array of single junction sorters for the purpose of characterizing the particles in the fluid. Thus, the light for control of sorting and particle characterization is delivered and collected through at least one objective lens, covering the whole area of the two-dimensional array of single junction sorters, as the objective lens arrangement is configured to illuminate the whole area of the two-dimensional array.

The microfluidic chip may comprise a silicon substrate, a resistor layer, a tracks layer, a passivation layer, an anti-cavitation layer, and an optical layer.

The consumable cartridge may comprise a chip mount which supports the microfluidic chip in the consumable cartridge, the chip mount comprising: a first elastomeric seal for sealing the fluidic connection between the inlet and the input channel; and a second elastomeric seal for sealing the respective fluidic connections between the output positive channel and the output negative channel and the first and second outlets. The first and/or second elastomeric seal may comprise complementary ridges and grooves.

The consumable cartridge may comprise a locating feature for positioning the chip mount on an instrument of the particle sorter system. The locating feature may contain one of holes and posts for mating with complementary other of holes and posts of the instrument.

The chip mount may comprise an optical window for optical analysis of particles flowing through the microfluidic chip in operation.

The chip mount may comprise an electrical connector for electrically connecting the microfluidic chip with the instrument.

The chip mount may comprise complementary first and second half pieces (see first half 203 and second half 207 with reference to FIGS. 2A-D) which are mated together so as to seal around the microfluidic chip. The first and second half pieces of the chip mount may be mated together by means of mechanical fasteners. The first half piece may comprise the locating feature and the optical window and the second half piece may comprise the first and/or second elastomeric seals and the electrical connector.

According to another aspect of the invention, there is provided a chip mount for supporting a microfluidic chip in a consumable cartridge for a particle sorter system, the chip mount comprising elastomeric seals for sealing fluidic connections between the microfluidic chip and an inlet and outlets of the consumable cartridge. The elastomeric seals may comprise complementary ridges and grooves.

The chip mount may comprise a locating feature for positioning the chip mount on an instrument of the particle sorter system. The locating feature may comprise one of holes and posts for mating with complementary other of holes and posts of the instrument.

The chip mount may comprise an electrical connector for electrically connecting the microfluidic chip with the/an instrument of the particle sorter system.

The chip mount may comprise an optical window for optical analysis of particles flowing through the microfluidic chip in operation.

The chip mount may comprise complementary first and second half pieces for mating together so as to seal around the microfluidic chip. The chip mount may comprise mechanical fasteners for mating the first and second half pieces together. The first half piece may comprise the locating feature and the optical window and the second half piece may comprise the elastomeric seals and the electrical connector.

According to another aspect of the invention, there is provided an instrument for a particle sorter system, the system comprising a consumable cartridge including a microfluidic chip supported by a chip mount, the instrument comprising an interface feature for locating the chip mount on the instrument.

The interface feature may comprise holes or posts for mating with complementary holes or posts of the chip mount. The interface feature may comprise a pinch valve to enable unclogging of particles in the microfluidic chip in operation.

The interface feature may comprise an aperture to enable optical interrogation of the microfluidic chip.

The instrument may comprise an optical system configured to measure fluorescence in epi-illumination from the microfluidic chip.

The instrument may comprise an optical system configured to measure light scattering in reflection from the microfluidic chip.

The optical system may comprise an eccentrically mounted bar for blocking of a direct laser beam and measurement of light scatter.

The optical system may comprise a crescent-shaped aperture for blocking of a direct laser beam and measurement of light scatter from an off-axis laser beam.

The optical system may comprise moveable slits for blocking one or more laser foci from reaching one or more detectors.

The instrument may comprise an electrical connector for electrically connecting the instrument with the microfluidic chip.

The instrument may comprise any or all of: an optical measurement system comprising light sources, filters, lenses, detectors and mechanical components; an electronic control system comprising analog to digital converters (ADCs), a field-programmable gate array (FPGA), a PC with a graphical user interface (GUI) and power electronics; an interface for the consumable cartridge comprising mechanical and electrical connections and one or more optical windows.

According to another aspect of the invention, there is provided a particle sorter system comprising: a consumable cartridge as described herein above; and one or both of a syringe for providing the particle-containing fluid to the inlet and an instrument as described herein above.

According to another aspect of the invention, there is provided an inertial particle focusser for a microfluidic particle sorter, the inertial particle focusser comprising: an asymmetric upstream channel section comprising a plurality of alternating bends, a first set of the bends having a greater radius of curvature in a first direction and a second set of the bends having a smaller radius of curvature in a second, opposite direction; and a symmetric downstream channel section comprising a plurality of alternating bends having an equal radius of curvature in the first and second directions.

The inertial particle focusser may comprise a hairpin bend channel section located between the asymmetric upstream channel section and the symmetric downstream channel section, such that the asymmetric upstream channel section and the symmetric downstream channel section are arranged generally parallel with each other.

The inertial particle focusser may comprise two or more serpentine channel sections separated by one or more hairpin bends.

BRIEF DESCRIPTION OF THE DRAWINGS

Examples will now be described, by way of example, with reference to the accompanying figures in which:

FIG. 4 A-B shows the chip design;

FIG. 6 A-C shows an instrument-consumable cartridge interface;

FIG. 7 A-D shows an optical assembly within the instrument;

FIG. 8 A-C shows further details of the optics; and

DETAILED DISCUSSION

Figure 1A:
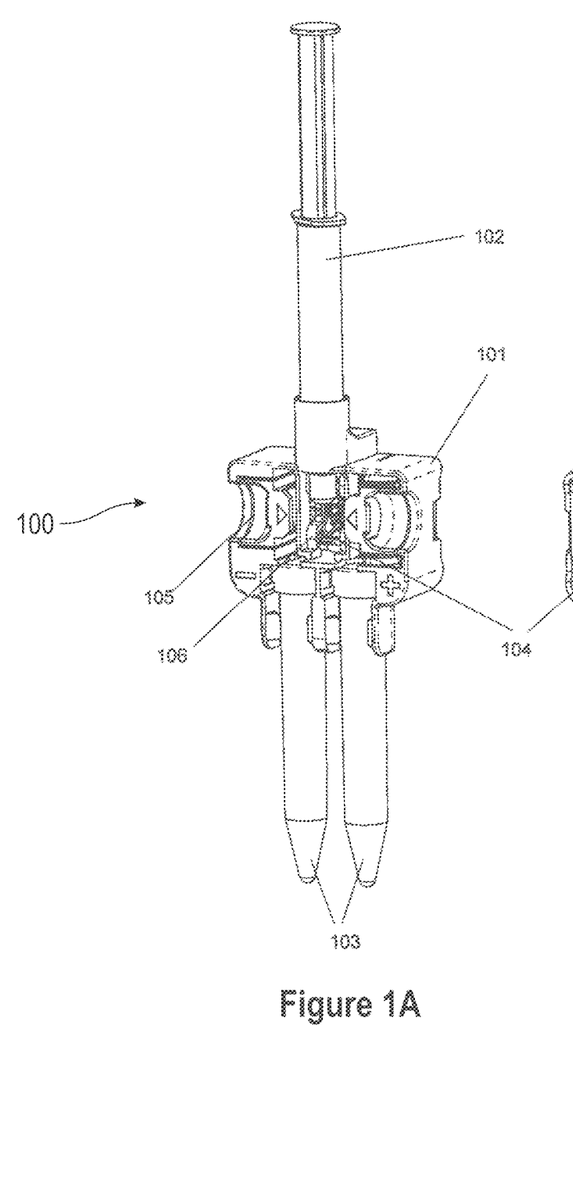
FIG. 1A-B shows a consumable cartridge according to the invention.
Figure 1B:
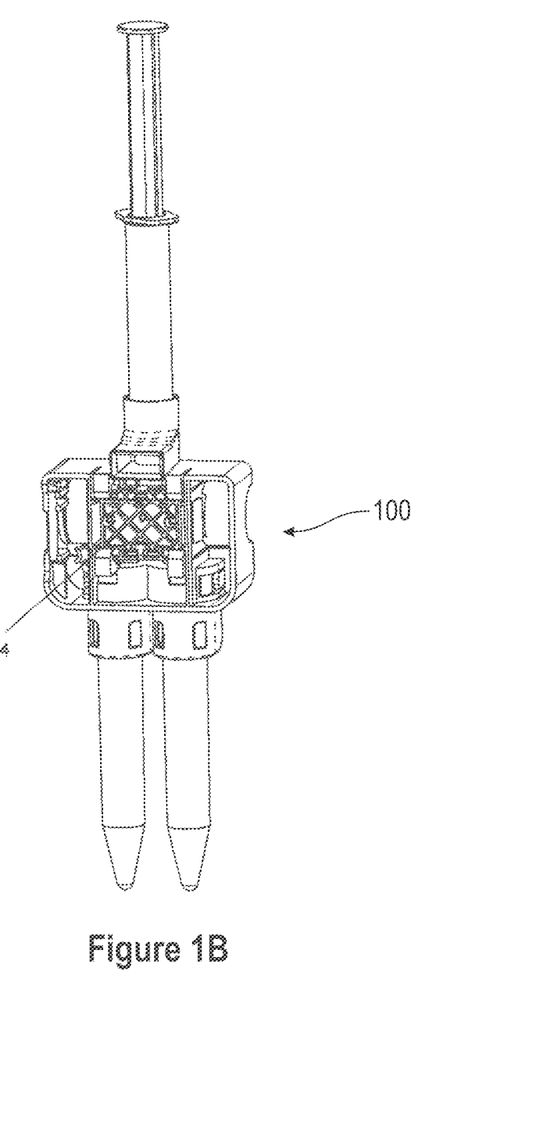

A consumable cartridge 100 is shown in FIG. 1A-B. A shell 101 comprises a syringe connector which holds a removable input syringe 102, two removable output centrifuge tubes with vented caps 103, a chip mount 104, and tubing connecting the syringe and output tubes to the chip mount. The shell further comprises finger grips 105, for the user to hold and insert the consumable onto the instrument-consumable cartridge interface. The shell also comprises a sprung section 106 that locates the chip mount within the shell.

The syringe connector may be a luer adapter, a threaded adapter, or any type of connector that seals a syringe onto a tube.

Figures 2A, 2B:
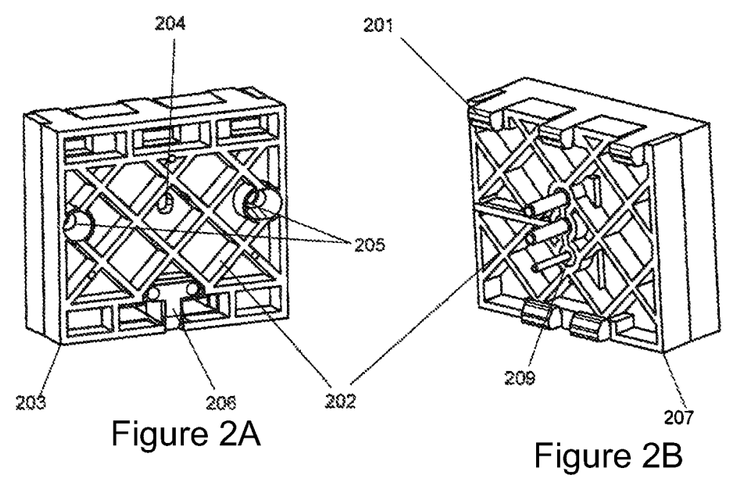
FIG. 2A-D shows a chip mount within the consumable cartridge.
Figure 2C:
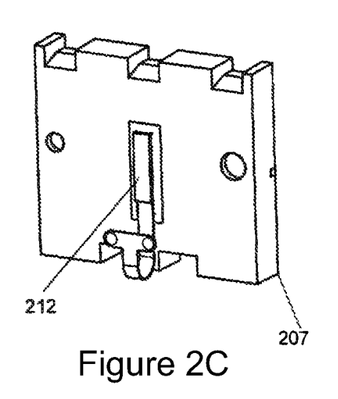
Figure 2D:
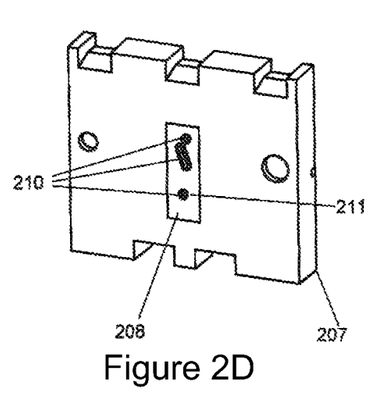

The chip mount is shown in FIG. 2 A-D and comprises two moulded plastic halves, which snap together mechanically, via catchments in the moulding 201. Both halves are structured with ribs 202 for increased bending rigidity.

A first half 203 is designed to mate with the instrument, and provides an optical window 204 along with two sockets 205 for precise location on matching posts on the instrument-consumable cartridge interface, and accommodates a flexible circuit connector 206, which wraps around its edge.

The second half 207 provides an elastomeric seal 208, which makes a fluidic seal onto the microfluidic chip 212, and which extends through the body of the second half to seal onto input and output tubing 209. In the elastomeric seal are moulded grooves and ridges 210 which connect the fluid ports in the microfluidic chip 212 to the input and output tubing. The input port 211 is situated away from the output ports so that it can seal to a higher pressure. The first half 203 and the second half 207 are complementary pieces mated together so as to seal around the microfluidic chip 212.

Figure 3:
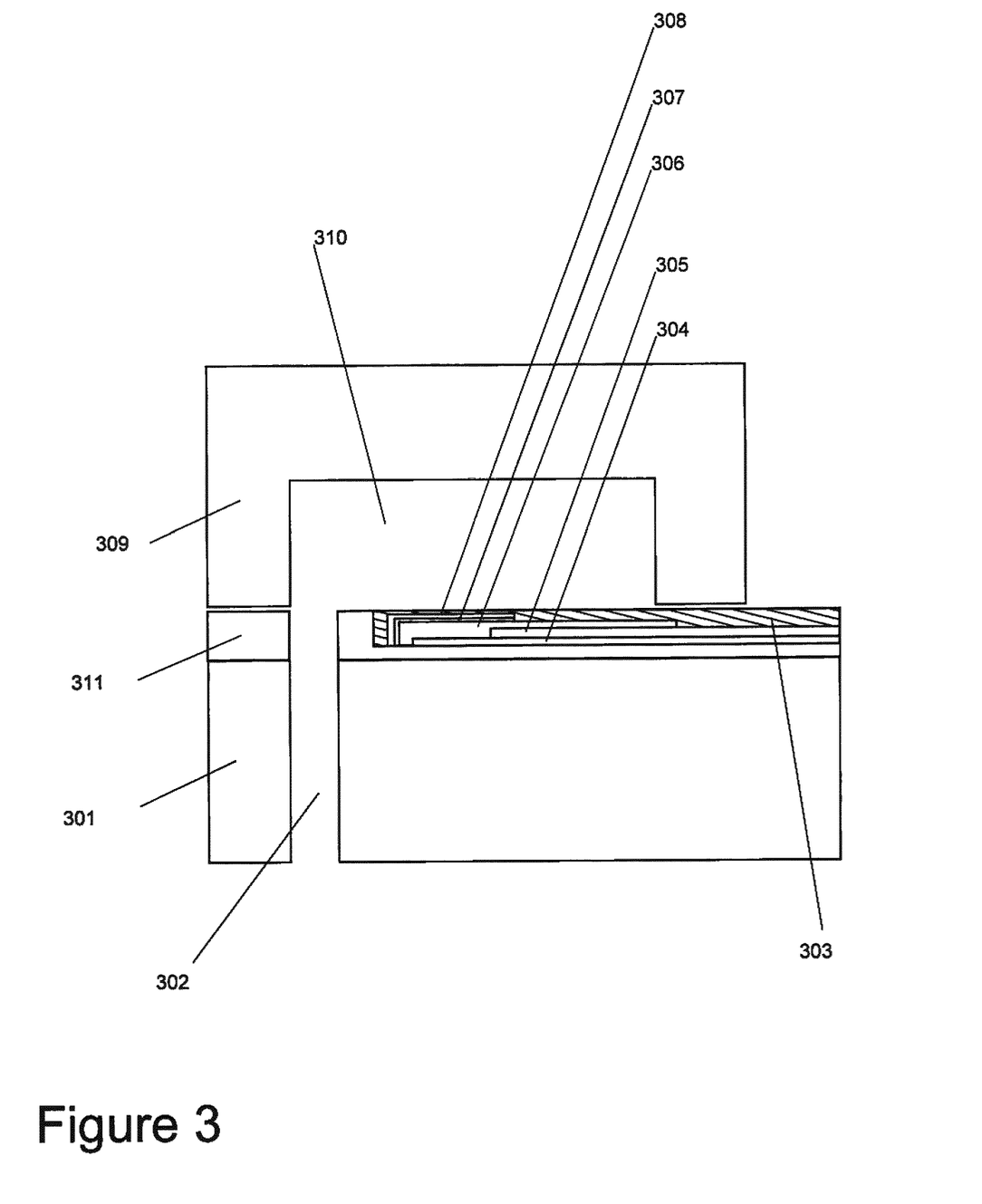
FIG. 3 shows the chip layer structure.

The chip layer structure is shown in FIG. 3, not to scale, and comprises: a silicon substrate 301, with a thermally deposited layer of silicon dioxide 311, in which through-vias are etched to make the input and output ports 302. A trench layer 303 is etched on the front of the substrate, to accommodate thin film layers. A resistor layer 304 of titanium is deposited in the trench, followed by a track layer 305 of gold or aluminium. The track layer also provides electrical connection pads on the edge of the chip, and an optical mirror feature in the sorter region. A passivation layer 306 of silicon nitride is deposited on top of the electrical features via chemical vapour deposition. An adhesion layer 307 of chromium is deposited on top of the passivation layer. An anti-cavitation layer 308 of tantalum, tantalum nitride or tantalum aluminium nitride is deposited on top of the passivation layer, specifically above the actuator. Finally a second glass layer 309, with microfluidic channels 310 etched in one face, is anodically bonded to the silicon substrate. The microfluidic channels in the glass may be made by deep reactive ion etching or by several other available techniques for patterning glass. The surfaces of the microfluidic channels may be polished to preserve optical and imaging quality by thermal, chemical or laser polishing techniques.

The chip design is shown in FIG. 4A-B and comprises an input port 401, an output positive port 402, and an output negative port 403. From the input port is connected an inertial particle focusser 404, or another microfluidic particle focusing device. The focusser is connected to the sorter device (shown in FIG. 4 detail inset), which comprises an input channel 410, a microheater 405, which is protected by anti-cavitation and passivation layers from the solution, a vortex-creating edge 406, and a particle sorter junction 413 where the channel splits into positive 407 and negative 408 output channels. At least one enclosed fluidic path 414 is provided in the consumable cartridge between the input inlet and a first and second outlet. A first flexible tube 415 may be connected between the positive output channel 407 and the output positive port 402. A second flexible tube 416 may be connected between the output negative channel 408 and the output negative port 403. At least one of the first flexible tube 415 or the second flexible tube 416 is deformable to enable unclogging of particles in the particle sorter junction 413 in operation. A mirror layer 409 is deposited on the silicon substrate under the channel to aid imaging. Conductive tracks 411 and contact pads 412 are provided. The channels widths are chosen such that the centre streamline is biased towards the negative output channel, and particles thus flow to the negative output unless actively sorted. A typical split of output flows are 60%:40% in favour of the negative output, and an example set of dimensions is below. The chip design may include a bubble generator 417, operable to selectively displace the fluid around a particle to be sorted and thereby to create a transient flow of the fluid in the input channel 410; and a vortex element, configured to cause a vortex in the transient flow in order to direct the particle to be sorted into the output positive channel 407. The vortex element may comprise a protrusion 418 in the input channel 410. The vortex element may comprise a turn in the input channel 410. The vortex element may comprise a recess in the input channel 410. The vortex element may be between the bubble generator 417 and the output positive channel 407. The bubble generator 417 may comprise the microheater 405.

In an example, such as is shown in FIG. 4A, the inertial particle focusser 404 comprises several channel sections. The first section is an asymmetric serpentine channel, comprising alternating bends: a low-curvature bend in one direction followed by a high-curvature bend in the opposite direction, these bends being repeated several times. The second section is a symmetric serpentine channel comprising alternating bends: a bend in one direction followed by a bend in the opposite direction; both bends of equal curvature, these bends being repeated several times. Between the two sections is a hairpin bend, which allows the wrapping of the inertial focusser into a shorter overall length. The purpose of including an asymmetric serpentine section upstream is that the particle focussing effect proceeds within a relatively short device length. The purpose of including a symmetric serpentine section downstream, is that the accuracy of the particle focussing effect is improved relative to the asymmetric serpentine alone, and the particle position at the exit does not depend on size or density of the particle. It will be understood that the described inertial particle focusser is suitable for use not only in the microfluidic chip described herein, but also more generally in microfluidic particle sorters.

Thus the consumable comprises enclosed input and output vessels that can be connected and disconnected to a cartridge comprising a single-junction sorter chip, mounting components and tubing.

Figure 5:
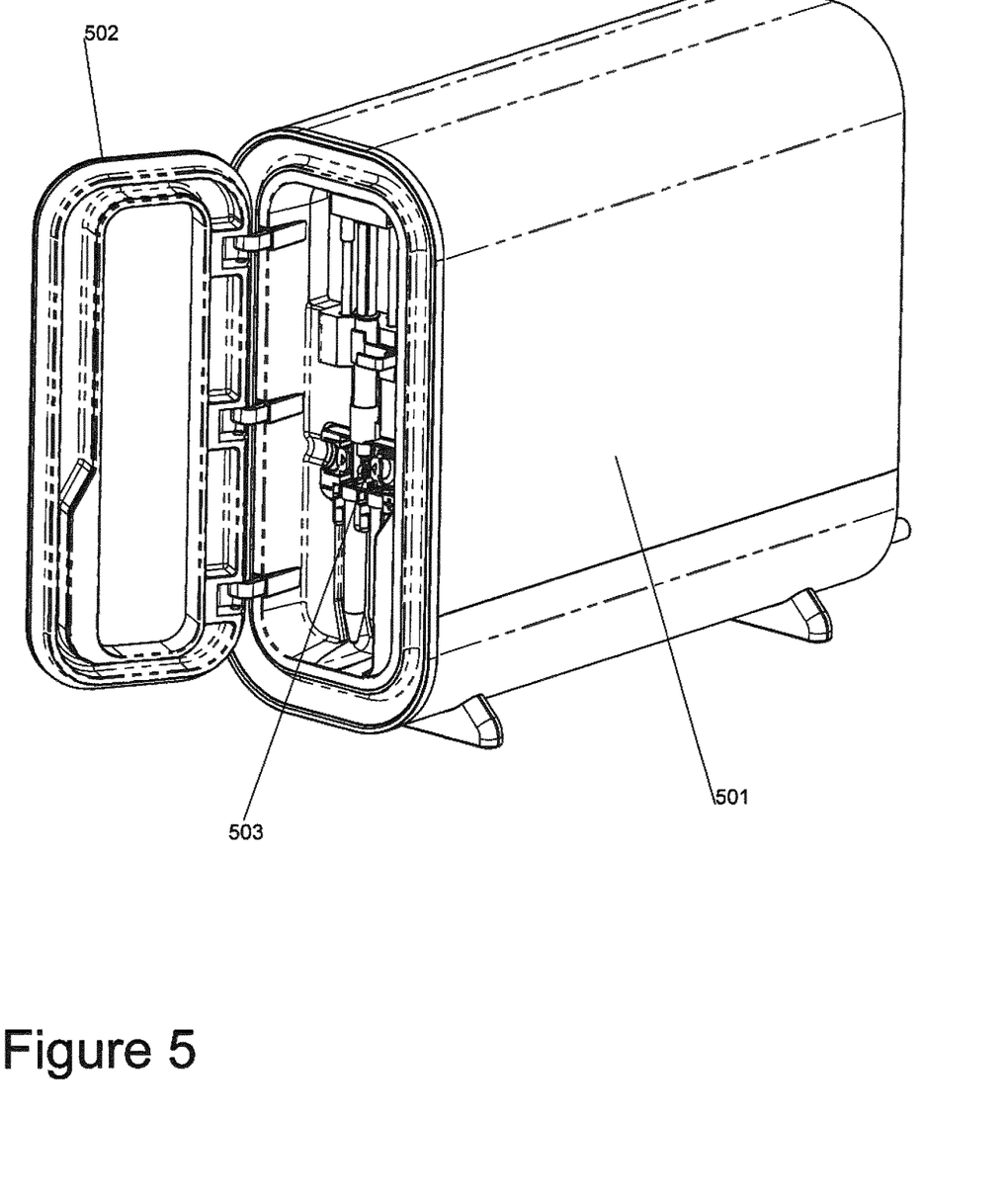
FIG. 5 shows an instrument according to the invention.

An instrument is shown in FIG. 5, showing a case 501 housing optics and electronics, with a door 502 on the front, providing laser safety interlocking and access to the instrument-consumable cartridge interface 503.

Figure 6A:
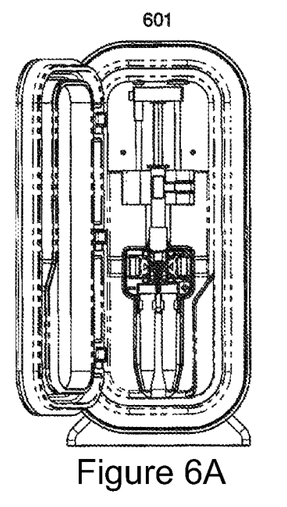
Figure 6B:
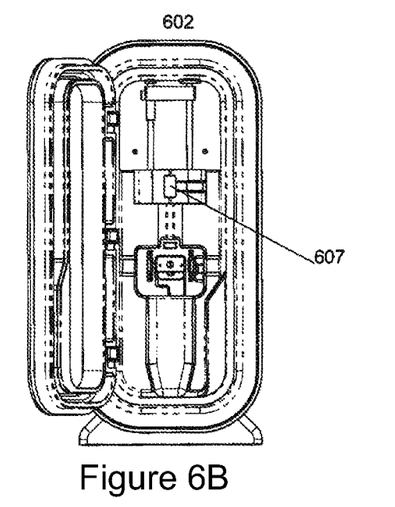
Figure 6C:
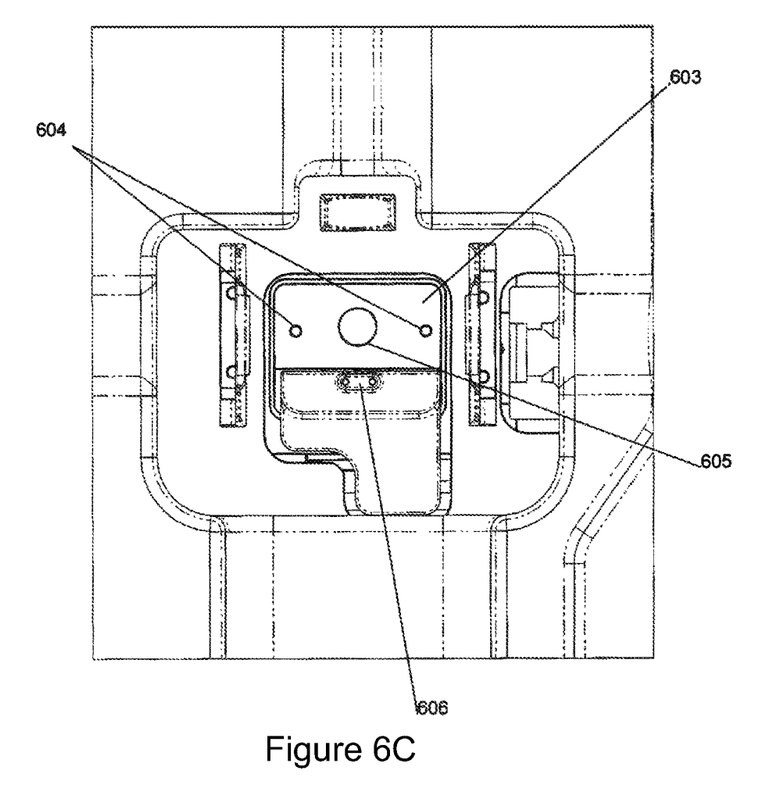
Figures 7A, 7B, 7C, 7D:
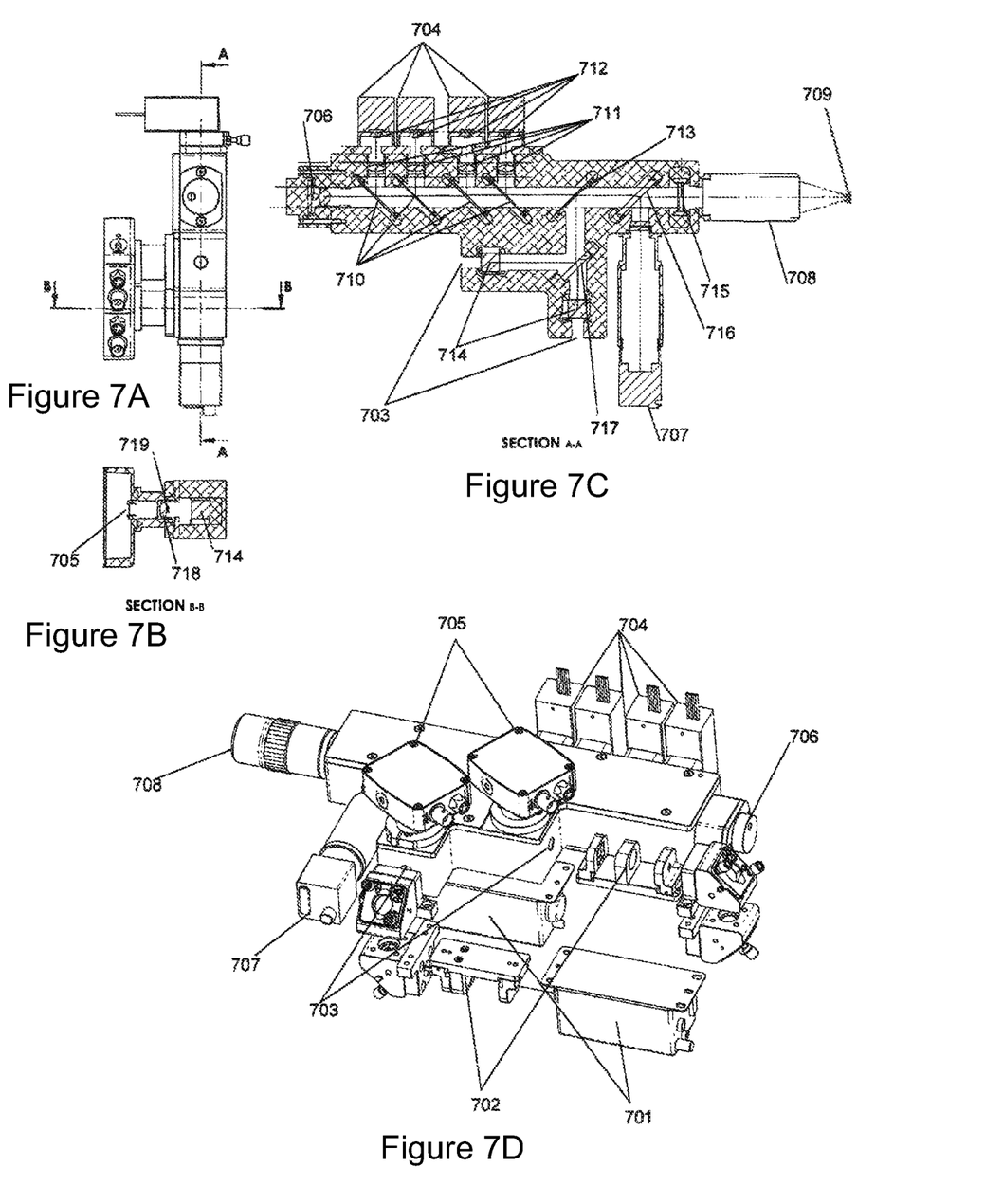

The instrument-cartridge interface is shown in FIG. 6A-C; details are including with and without the consumable cartridge mounted (601 and 602). FIG. 6A-C shows mounting surface 603 and posts 604, which mate with and precisely locate the consumable cartridge. The mounting surface is supported by a motorized 3-axis XYZ translation stage, which is able to move the consumable cartridge such that the input channel is precisely located at the focus of the laser beams. A hole 605 provides input of light from the instrument and collection of scattered and fluorescently emitted light output. A sprung electrical connector 606 makes contact with the flexible circuit connector on the consumable cartridge. A syringe driver 607 makes contact with the syringe which is received by the consumable cartridge.

The finger grips 105 on the shell are connected to the chip mount only via flexible mechanical linkages between the outside of the shell and the chip mount. Thus, on insertion of the consumable to the instrument-consumable cartridge interface, the location of the chip is determined by the mating of the sockets 205 with the matching posts 604.

An optical assembly is shown in FIG. 7A-D. Two lasers 701 are configured to focus within the input channel of the sorter chip: the laser beam passes through beam shaping lenses 702 and into holes 703 in the optical housing. Four photomultiplier tube (PMT) fluorescence detectors 704 and two photodiode 705 scattering detectors are configured to collect light from one or both of the laser foci. A strobe illumination LED 706 and a camera 707 are configured to image particles within the sorter device. Input and output light travels through an objective lens 708.

The optical system is configured for reflection imaging, reflected scatter and epifluorescence as follows: after entering the entrance holes 703, each beam passes through a polarizing beam splitter 714, and is combined by dichroic mirror 717 with a slight offset between beams. The beams reflect on dichroic mirror 713 and pass through dichroic mirror 716, from there passing through quarter-wave plate 715. The beams are then focused by objective lens 708 onto two separate spots on the chip 709 upstream of the sorter.

Collected light passes back through the objective lens 708 through the quarter wave plate 715 and dichroic mirror 716. After that it is split by a dichroic mirror 713, where light of the same wavelength as the lasers is reflected. This light is further split by a dichroic mirror 717 to the wavelength corresponding to each laser. Each reflected beam then enters polarizing beam splitters 714. Here the scattered light whose polarization has been rotated is reflected out of the plane of the drawing. While in the infinity plane 719 it passes through a beam stop, and is then focused by lens 718 onto a scattering detector 705.

The collected fluorescence light passes through dichroic mirror 717 and is reflected by dichroic mirrors 710 which each split off fluorescent light within a wavelength band. The light from each dichroic mirror is focused by a lens 711 onto the plane 712 of a movable slit. The slit selects from which laser beam focus to pass light through to the PMT 704.

Figure 8A:
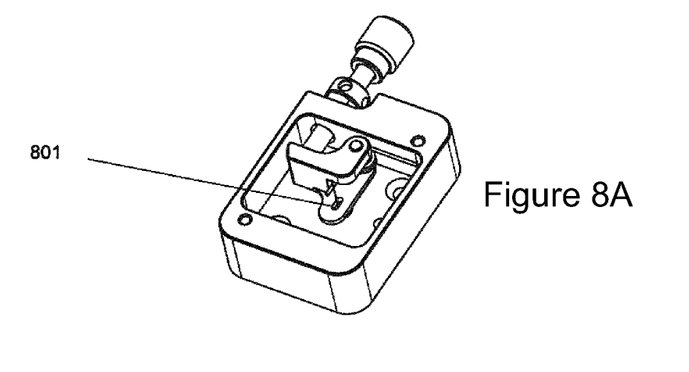
Figure 8B:
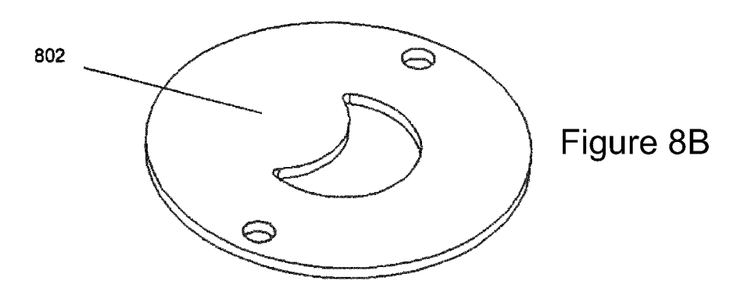
Figure 8C:
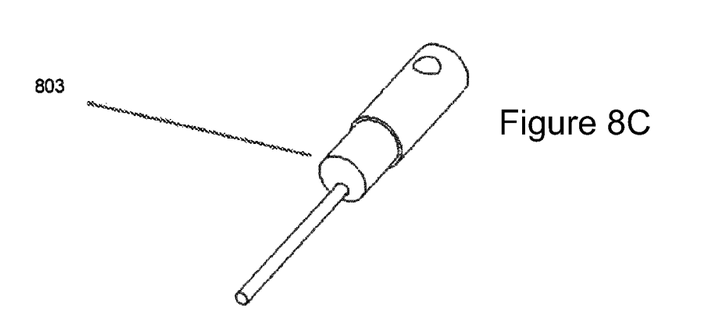

FIG. 8A-C shows the movable slits and beam stops. The movable slit 801 comprises a slit on a sprung screwed stage, and is situated in focus plane 712. Thus it is able to let one laser focus through and block the other. The beam stops are shown in 803 and 802 and are situated in plane 719 for forward scatter and side scatter respectively.

Beam stop bar 803 accurately stops the specular reflection of the on-axis beam, thus allowing small-angle scattered light through to the detector. The bar is mounted eccentrically so that the position of the stop may be adjusted.

Beam stop plate 802 comprises a crescent-shaped orifice or aperture. The plate thus blocks an off-axis beam, and lets through the large-angle scattered light to the detector.

Figure 9:
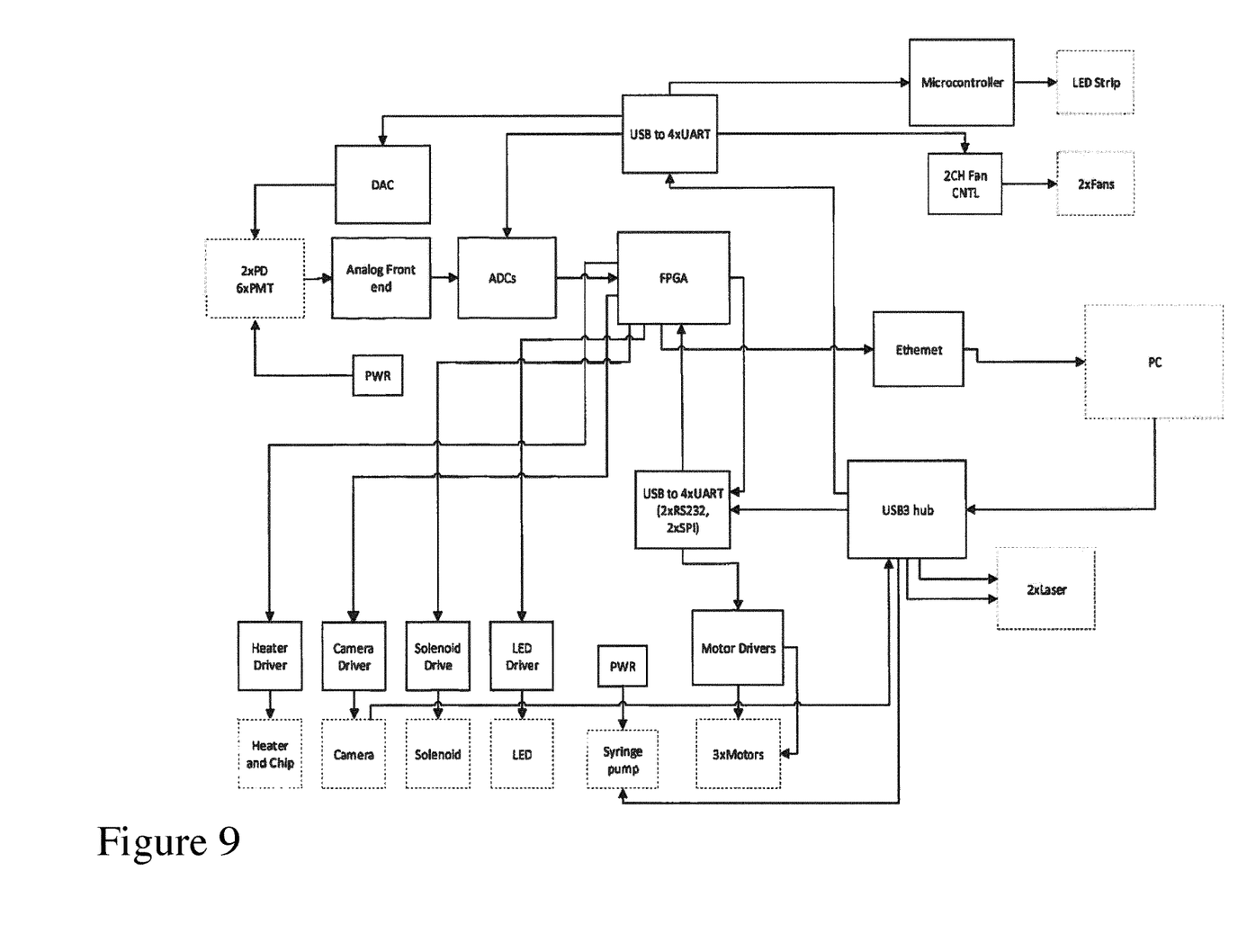
FIG. 9 shows an electronic control system.

An electronic control system is shown schematically in FIG. 9. All solid blocks are on the main control board, while dashed blocks are separate. Two photodiodes (PDs) and up to six photomultiplier tubes (PMTs) are connected to and are powered by the PCB. The PMTs have a programmable gain which is set by a DAC. Signals from the PDs and PMTs first go through an analogue front end conditioning their signals for the ADCs, these ADCs pass their readings on to the FPGA. The FPGA carries out signal processing, peak detection, and makes sorting decisions. The FPGA then triggers the microheater, LED, camera, and pinch valve solenoid drivers, which drive the microheater, LED, camera, pinch valve solenoid, respectively. Finally, the FPGA is connected to an external PC via ethernet, sending peak data and receiving settings.

The external PC is also connected to a USB3 hub on the PCB. This USB hub is connected to, and allows control of, the two lasers and syringe pump via USB. The hub is further connected to two USB to 4×UART converters which allow control of the DAC, stage-positioning motor drivers, microcontroller, and fan controller via serial communications. The microcontroller drivers an LED strip for visual indications to the user, and the fan driver monitors temperature and drives chassis fans.

It will be understood that the invention has been described in relation to its preferred examples and may be modified in many different ways without departing from the scope of the invention as defined by the accompanying claims.

In an example, a magnetic stir bar is placed within the syringe, while a rotating magnet or electrically generated rotating magnetic field is placed on the instrument, being configured to rotated the magnetic stir bar within the syringe and mix the sample.

The invention claimed is:

1. A consumable cartridge comprising:
a microfluidic chip comprising:
an input channel configured to receive a particle-containing fluid;
a particle sorter junction in fluidic connection with the input channel and comprising an output positive channel and an output negative channel; and
first and second outlets in fluidic connection with the output positive channel and the output negative channel respectively, such that at least one enclosed fluidic path is provided in the consumable cartridge between the input channel and the first and second outlets, the at least one enclosed fluidic path comprising at least one of:
a first flexible tube connected between the output positive channel and the first outlet; and
a second flexible tube connected between the output negative channel and the second outlet,
wherein at least one of the first flexible tube or the second flexible tube is deformable to enable unclogging of particles in the particle sorter junction in operation.

2. The consumable cartridge according to claim 1, wherein at least one of the first and second outlets are configured for detachable connection with a complementary tubular vessel.

3. The consumable cartridge according to claim 1, wherein the microfluidic chip further comprises:
a bubble generator, operable to selectively displace the fluid around a particle to be sorted and thereby to create a transient flow of the fluid in the input channel; and
a vortex element, configured to cause a vortex in the transient flow in order to direct the particle to be sorted into the output positive channel.

4. The consumable cartridge according to claim 3, wherein the vortex element comprises a protrusion in the input channel.

5. The consumable cartridge according to claim 3, wherein the vortex element is located between the bubble generator and the output positive channel.

6. The consumable cartridge according to claim 3, wherein the bubble generator comprises a microheater.

7. The consumable cartridge according to claim 1, further comprising an inertial focuser configured to centralize particles in the fluid along a center of the input channel.

8. The consumable cartridge according to claim 7, wherein the inertial focuser comprises a serpentine channel.

9. The consumable cartridge according to claim 1, further comprising a valve configured to close to prevent the fluid passing through the output positive channel in order to disrupt a flow of the fluid and thereby direct accumulated debris towards the output negative channel.

10. The consumable cartridge according to claim 1, wherein the microfluidic chip comprises a silicon substrate, a resistor layer, a passivation layer, an anti-cavitation layer, and an optical layer.

11. The consumable cartridge according to claim 1, further comprising a chip mount that supports the microfluidic chip in the consumable cartridge, the chip mount comprising:
an elastomeric seal.

12. The consumable cartridge according to claim 11, wherein the elastomeric seal comprises complementary ridges and grooves.

13. The consumable cartridge according to claim 11, wherein the chip mount comprises two plastic halves configured to snap together mechanically.

14. The consumable cartridge according to claim 11, wherein the chip mount comprises an optical window for optical analysis of particles flowing through the microfluidic chip in operation.

15. The consumable cartridge according to claim 13, wherein the chip mount comprises an electrical connector.

16. The consumable cartridge according to claim 11, wherein the chip mount comprises a complementary first half piece and a second half piece which are mated together so as to seal around the microfluidic chip.

17. The consumable cartridge according to The consumable cartridge according to claim 10, wherein the anti-cavitation layer is deposited on top of the passivation layer.

* * * * *